Figure 1:
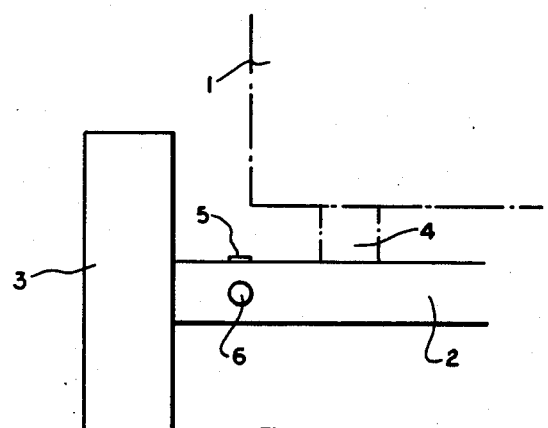

United States Patent [19]

Harbour

[11] Patent Number: 4,641,719

[45] Date of Patent: Feb. 10, 1987

[54] STRAIN GAUGE ASSEMBLIES

[75] Inventor: John Harbour, Chippenham, Great Britain

[73] Assignee: TRW Probe Electronics Co. Ltd., Gloucestershire, Great Britain

[21] Appl. No.: 681,232

[22] Filed: Dec. 13, 1984

[30] Foreign Application Priority Data

Dec. 17, 1983 [GB] United Kingdom ............... 8333679

[51] Int. Cl.⁴ .................... G01G 19/08; G01G 3/14
[52] U.S. Cl. ..................................... 177/136; 177/211
[58] Field of Search ................................ 177/136, 211

[56] References Cited

U.S. PATENT DOCUMENTS

| 3,203,234 | 8/1965 | Westcott, Jr. et al. | |
| 3,365,689 | 1/1968 | Kutsay. | |
| 3,650,340 | 3/1972 | Bradley | 177/136 |
| 3,695,096 | 10/1972 | Kutsay. | |
| 3,780,817 | 12/1973 | Videon | 177/136 |
| 3,800,895 | 4/1974 | Gale et al. | 177/211 X |
| 3,878,908 | 4/1975 | Andersson et al. | 177/136 |
| 4,166,997 | 9/1979 | Kistler. | |

FOREIGN PATENT DOCUMENTS

| 1912304 | 9/1970 | Fed. Rep. of Germany. | |
| 2005646 | 1/1971 | Fed. Rep. of Germany | 177/136 |
| 2413067 | 10/1974 | Fed. Rep. of Germany. | |
| 2653938 | 6/1977 | Fed. Rep. of Germany. | |
| 2917967 | 11/1980 | Fed. Rep. of Germany. | |
| 8201410 | 8/1983 | France. | |
| 1290342 | 9/1972 | United Kingdom. | |
| 1461396 | 1/1977 | United Kingdom. | |
| 1559596 | 1/1980 | United Kingdom. | |

OTHER PUBLICATIONS

"Modern Strain Gage Transducers . . . Their Design and Construction". *Transducer Tutorial in Epsilonics*, v. 2, No. 2, Jul. 1982 pp. 6–7.

Primary Examiner—E. A. Goldberg
Assistant Examiner—Patrick W. Foster
Attorney, Agent, or Firm—Yount & Tarolli

[57] ABSTRACT

Strain gauge transducers (5,6,7,8,9) are fitted in pairs to a vehicle axle (2), generally between each wheel (3) and the adjacent suspension (4). They have strain gauges in balanced bridge formation and their orientation is such that their outputs can be combined to produce an indication of various loads, eliminating the influence of irrelevant strains. In one pairing, one transducer is on top of the axle while the other is on a front or rear face. In another pairing both transducers are on top of the axle at different longitudinal positions.

3 Claims, 2 Drawing Figures

STRAIN GAUGE ASSEMBLIES

This invention relates to strain gauge assemblies, and is concerned with alternative techniques to those described in our co-pending U.S. patent application Ser. No. 616,956.

It will be assumed that the strain gauge sensors described there are known and that further explanation of them is unnecessary. It will further be assumed that, although this specification will mainly confine itself to one wheel and an adjacent suspension point, the sensors can be fitted all round a vehicle, or on selected axles only. Also, the technique of combining the outputs of various sensors to obtain total rather then individual loads has been described and will be taken to be applicable here.

It is not always possible to mount the sensors in the positions described in that previous Application. Also, although they can provide extensive information about various loads, fairly complicated computation has to be carried out. Thus, readings of strains at other points on an axle may be advantageous in some circumstances.

According to one aspect of the present invention there is provided a strain gauge assembly applied to a mechanical system having a stator and a rotor co-axially carried thereby, the rotor and stator being subject to loads in opposite directions transverse to the axis but offset from one another along the axis, and there being variable torsional loads about said axis between the stator and the rotor, wherein two strain gauge sensors, each providing a balanced bridge circuit, are fitted to the stator between the rectilinear load vectors, one being bisected by the plane containing the common axis and said vectors and being oriented to respond to shear strain produced by torque only, and the other being offset to one side of said plane, parallel therewith, and oriented to respond to the shear strain produced by a combination of torque and loading parallel to said two directions.

Generally, the sensors will be at the same longitudinal position between said vectors. Thus, as well as reading torque from the first sensor, by a subtractive computation of the two outputs, the load can be determined.

According to another aspect of the present invention there is provided a strain gauge assembly applied to a mechanical system having a stator and a rotor co-axially carried thereby, the rotor and stator being subject to loads in opposite directions transverse to the axis but offset from one another along the axis, and there being variable torsional loads about said axis between the stator and the rotor, wherein two strain gauge sensors, each providing a balanced bridge circuit, are fitted to the stator at axially spaced points, at least one being between the rectilinear load vectors, each being bisected by the plane containing the common axis and said vectors being oriented to respond to the local surface strain produced by bending of the stator in said plane.

This loading may be compressive or tensile, according to whether the sensors are mounted on top of or underneath an axle for example.

The difference between the sensor outputs will be indicative of the differences in bending moments and hence the load.

Both sensors may be between the rectilinear load vectors, or one sensor may be between those vectors with the other beyond the load point on the stator with respect to the rotor. In that case, where there are two rotors at opposite ends of a stator, the latter being subject to two symmetrically disposed loads, there can be a single central sensor and a sensor near each end outside the stator load points. The output of the central sensor can be separately combined with the output of either of the other sensors to derive bending moments at each end.

Generally, the mechanical system will be the axle and wheel of a vehicle, the axle being the stator, the wheel the rotor, the weight of the vehicle providing the load on the axle or stator, the ground reaction the load on the wheel or rotor, and a brake the variable torsional load.

Figure 2:
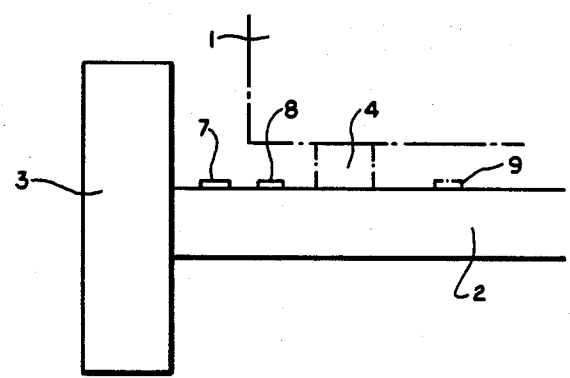
Figure 2:
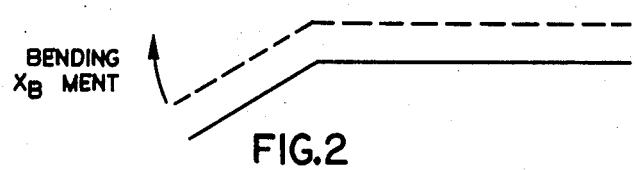

For a better understanding of the invention, some embodiments will now be described, by way of example, with reference to the accompanying drawing, in which:

FIG. 1 is a diagrammatic end view of part of a vehicle showing a wheel and axle with one sensor arrangement, and FIG. 2 is view similar to FIG. 1 with another sensor arrangement, accompanied by a bending moment diagram.

In FIG. 1 a vehicle body 1 is supported on an axle 2 with a wheel 3 outboard of the suspension system 4. Strain gauge sensors 5 and 6 are mounted on the axle between the wheel and suspension and at the same axial distance therefrom. The sensor 5 is on top of the axle (it could be underneath) while the sensor 6 is on the side, in a vertical plane. Both sensors are of the bridge type described in application Ser. No. 616,958. The sensor 5 is oriented so that it gives a response corresponding to torque alone, while the sensor 6 is arranged to give an output that combines torque and shear due to load. The latter is of course directly related to the axle loading, and by subtracting the outputs of these sensors a direct read-out of load is obtainable.

In FIG. 2, the parts of the vehicle are similarly referenced, while there are two sensors 7 and 8 mounted on top of the axle between the wheel and suspension system. They are oriented to give outputs corresponding to the compression at two axially spaced points, which is indicative of the local bending moments. The shear strain due to load is the differential of such bending moments, and since the axial spacing of the sensors is known and constant, by subtraction the load can be determined.

Again, it is possible to mount the sensors below the axle, but this is not preferred.

If there is no room for two sensors between the wheel and suspension, one can be mounted at position 9 for example. If the axle is suitable, and in particular if it is a uniform beam so that the bending moment is constant between the suspension points as indicated in FIG. 2, this may be at the centre. Its output can then be paired selectively with single sensors outside the suspension near each end of the axle.

I claim:

1. A strain gauge assembly applied to a mechanical system having a stator and a rotor co-axially carried thereby, the rotor and stator being subject to loads in opposite directions transverse to the axis but offset from one another along the axis, and there being variable torsional loads about said axis between the stator and the rotor, wherein two strain gauge sensors, each providing a balanced bridge circuit are fitted to the stator between the rectilinear load vectors, one being bisected by the plane containing the common axis and said vectors and being oriented to respond to shear strain produced by torque only, and the other being offset to one side of said plane, parallel therewith, and oriented to respond to the shear strain produced by a combination of torque and loading parallel to said two directions.

2. A strain gauge assembly as claimed in claim 1, wherein said sensors are at the same longitudinal position between said vectors.

3. A strain gauge assembly as claimed in claim 1, wherein the mechanical system is the axle and wheel of a vehicle, the axle being the stator the wheel the rotor, the weight of the vehicle providing the load on the axle or stator, the ground reaction the load on the wheel or rotor, and a brake the variable torsional load.

* * * * *